(12) United States Patent
Smyth et al.

(10) Patent No.: US 9,036,337 B2
(45) Date of Patent: May 19, 2015

(54) PROTECTIVE ENCLOSURE FOR AN ELECTRONIC DEVICE

(75) Inventors: Gregory Ian Smyth, Mississauga (CA); Nicholas John James, Mississauga (CA)

(73) Assignee: PSION INC., Mississauga, Ontario (CA)

( * ) Notice: Subject to any disclaimer, the term of this patent is extended or adjusted under 35 U.S.C. 154(b) by 0 days.

(21) Appl. No.: 13/442,993

(22) Filed: Apr. 10, 2012

(65) Prior Publication Data

US 2013/0265696 A1 Oct. 10, 2013

(51) Int. Cl.
- *G06F 1/16* (2006.01)
- *H05K 5/00* (2006.01)
- *H05K 7/00* (2006.01)
- *G06F 1/18* (2006.01)

(52) U.S. Cl.
CPC .................................... *G06F 1/182* (2013.01)

(58) Field of Classification Search
CPC . H05K 5/0004; H05K 5/0013; H05K 5/0034; H04M 1/185; H04B 1/3888
USPC ............ 361/730, 752, 757, 796, 800, 679.01, 361/679.32, 679.34, 679.02; 264/453, 478
See application file for complete search history.

(56) References Cited

U.S. PATENT DOCUMENTS

| | | | | |
|---|---|---|---|---|
| 4,766,520 A * | 8/1988 | Huber et al. | ............... | 361/813 |
| 5,438,482 A * | 8/1995 | Nakamura et al. | ............ | 361/816 |
| 5,872,332 A * | 2/1999 | Verma | .......................... | 174/386 |
| 6,011,698 A * | 1/2000 | Buehler | ....................... | 361/799 |
| 6,522,763 B2 * | 2/2003 | Burleson et al. | .............. | 381/189 |
| 7,142,433 B2 * | 11/2006 | Lechner | ....................... | 361/797 |
| 7,787,239 B2 * | 8/2010 | Mangaroo et al. | ........ | 361/679.01 |
| 7,855,892 B2 * | 12/2010 | Lin | ............................... | 361/730 |
| 7,965,500 B1 * | 6/2011 | Bruce et al. | .............. | 361/679.34 |
| 8,075,536 B2 * | 12/2011 | Gray et al. | .............. | 604/288.01 |
| 8,149,594 B2 * | 4/2012 | Nishihata | ...................... | 361/818 |
| 8,283,576 B2 * | 10/2012 | Schell et al. | .................. | 174/375 |
| 8,479,875 B2 * | 7/2013 | Richardson et al. | .......... | 181/205 |
| 8,509,865 B1 * | 8/2013 | LaColla et al. | ............. | 455/575.8 |
| 2002/0079244 A1 * | 6/2002 | Kwong | .......................... | 206/305 |
| 2004/0120124 A1 * | 6/2004 | Cauwels | ....................... | 361/752 |
| 2007/0159801 A1 * | 7/2007 | Castaneda et al. | ............ | 361/730 |

(Continued)

FOREIGN PATENT DOCUMENTS

CA 1115761 A1 * 1/1982 ............... H05B 3/20
WO WO 2012030641 A1 * 3/2012

OTHER PUBLICATIONS

"PolyOne Versollan™ OM 1262NX-9 Thermoplastic Elastomer (TPE)," 33587 Walker Road, Avon Lake, Ohio, USA, Retrieved from http://www.matweb.com/search/datasheettext.aspx?matguid=6fe2de6a8fb14d148b25667d93ea4869 on Jun. 5, 2014, pp. 1-3.

(Continued)

*Primary Examiner* — Lisa Lea Edmonds
*Assistant Examiner* — Keith Depew

(57) ABSTRACT

An enclosure is provided for a device comprising one or more electronic assemblies where the enclosure deforms under a shock in one or more selected manners to dissipate the shock energy. The deformation, which is elastic deformation, occurs at selected parts of the enclosure and/or in selected translations and/or rotations where those selections are made by the designer of the enclosure. By being able to define where and how the deformations will occur, the electronic assemblies can be located, mounted and interconnect within the enclosure such that the deformation does not adversely affect the assemblies or device.

20 Claims, 13 Drawing Sheets

(56) References Cited

U.S. PATENT DOCUMENTS

| | | |
|---|---|---|
| 2009/0009935 A1* | 1/2009 | Hsu et al. .................... 361/679 |
| 2009/0154182 A1* | 6/2009 | Veenstra et al. ............. 362/487 |
| 2010/0203931 A1* | 8/2010 | Hynecek et al. ........... 455/575.8 |
| 2011/0228459 A1* | 9/2011 | Richardson et al. ..... 361/679.01 |
| 2011/0316759 A1* | 12/2011 | Fan et al. .................... 343/873 |
| 2012/0327565 A1* | 12/2012 | Tages et al. ............. 361/679.01 |
| 2013/0113348 A1* | 5/2013 | Holben et al. .............. 312/223.1 |
| 2013/0201623 A1* | 8/2013 | Ellis ........................ 361/679.46 |

OTHER PUBLICATIONS

"ShinEtsu Silicones—KE-2090-40A/B," 1150 Damar Street, Akron, Ohio, USA, © 2001-2009 Shin-Etsu Chemical Co., Ltd., Retrieved from http://www.shinetsusilicones.com/content/ke-2090-40ab on Jun. 5, 2014, pp. 1-1.

* cited by examiner

PROTECTIVE ENCLOSURE FOR AN ELECTRONIC DEVICE

FIELD OF THE INVENTION

The present invention relates to an enclosure for an electronic device. More specifically, the present invention relates to an enclosure, and a system and method for manufacturing such an enclosure, for an electronic device which can protect electronic assemblies and components of the device during a physical shock.

BACKGROUND OF THE INVENTION

Electronic devices are ubiquitous in modern life. Smartphones, laptops, tablets, data capture devices such as RFID and/or barcode scanners, remote controls, sensors and a variety of other electronic devices are now commonplace and used in a wide range of environments, including mobile, industrial and residential locations.

Most electronic devices include one or more assemblies, or sub-assemblies, of electronic components which are mounted within an enclosure. These assemblies and/or subassemblies (hereinafter collectively "assemblies") can include circuit boards, displays, input devices, antennas, speakers, batteries, sensors, data storage components, etc. and the enclosure serves to provide a mounting framework to maintain the assemblies in place and in position with respect to one another.

The enclosure often also serves both to protect the assemblies from the surrounding environment (i.e.—to prevent water or foreign materials from contacting the assemblies and damaging them) and to prevent users from inadvertently contacting the assemblies, thus preventing electrical shocks and/or other undesired contact. Further, positioning the assemblies within the enclosure can ensure necessary spacing (such as for radio antennas) between the assemblies and a user or between the assemblies themselves.

Electronic devices can be exposed to undesired physical shocks due to impacts, drops, crushes, etc., (hereinafter collectively "shocks") especially if the device is intended to be portable or handheld. In such cases, it is desired that the enclosure can survive the largest expected shock and also that the device continue to function after the shock. Devices which purport to have these capabilities are typically referred to as "rugged" or "ruggedized" devices.

One failure mode which can occur with electronic devices occurs because of temporary deformation (e.g. bending, twisting, etc.) of the device enclosure, due to a shock, which can break assemblies such as displays and/or circuit boards and which can cause relative movement between assemblies within the enclosure, leading to failure of electrical interconnections between the assemblies or other negative effects.

Conventional rugged device designs have focused on strengthening the enclosure of the device to enhance the ability of the device to survive shocks by attempting to prevent deformation (or breakage) of the enclosure. For example, the Mac Book Pro™ laptop computers sold by Apple™ are fabricated from an aluminum unibody enclosure and the Toughbook™ laptop computers sold by Panasonic™ can have magnesium alloy enclosures. Other designs can employ enclosures molded from impact-resistant plastics, or other reinforced and/or composite materials.

While such enclosures can survive shocks, and may not deform unduly, their rigidity can result in the energy of the shock being transferred to the assemblies within their enclosures, resulting in damage to those assemblies. Accordingly, some rugged designs also include features such as resilient bumpers formed on, or attached to, the exterior corners or edges of the enclosure to absorb some of the energy of shocks and, in some designs, assemblies which are particularly susceptible to shocks (such as display screens and/or disk drives) may be mounted within the enclosure via resilient mounts in another attempt to absorb shock energy so that it does not damage these assemblies.

While such bumper-equipped designs can better survive shocks, they suffer from disadvantages in that they typically increase the cost of the device, increase the weight of the device and often increase the bulk of the device.

It is desired to have an enclosure for electronic devices which allows for rugged devices to be constructed at a reasonable cost and where those devices can better survive shocks.

SUMMARY OF THE INVENTION

It is an object of the present invention to provide a novel system and method for manufacturing an enclosure for an electronic device which can protect electronic assemblies and components of the device during a physical shock, where the enclosure obviates or mitigates at least one disadvantage of the prior art.

According to a first aspect of the present invention, there is provided an enclosure for an electronic device comprising at least one assembly of electronic components, the enclosure comprising: a set of inserts overmolded with a moldable material to define at least one compartment to receive the at least one assembly of electronic components, the compartment being elastically deformable under physical shock to dissipate energy to inhibit damage to the at least one assembly of electronic components.

Preferably, the set of inserts comprises a back panel and a frame member or a back panel and a set of side inserts. Also preferably, the set of inserts are interconnected by link members formed with the inserts. Also preferably, the link members can operate to constrain movement, in selected manners, between interconnected inserts.

The present invention provides an enclosure for a device comprising one or more electronic assemblies where that enclosure is designed such that, under a shock due to a drop, impact or other event, the enclosure will deform in one or more selected manners to dissipate the impact energy. The deformation, which is elastic deformation, occurs at selected parts of the enclosure and/or in selected translations and/or rotations of the enclosure or parts of the enclosure, where those selections are made by the designer of the enclosure. By being able to define where and how the elastic deformations will occur, the designer can locate, mount and interconnect the electronic assemblies within the enclosure to inhibit the occurrence of damage to the assemblies and the device.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
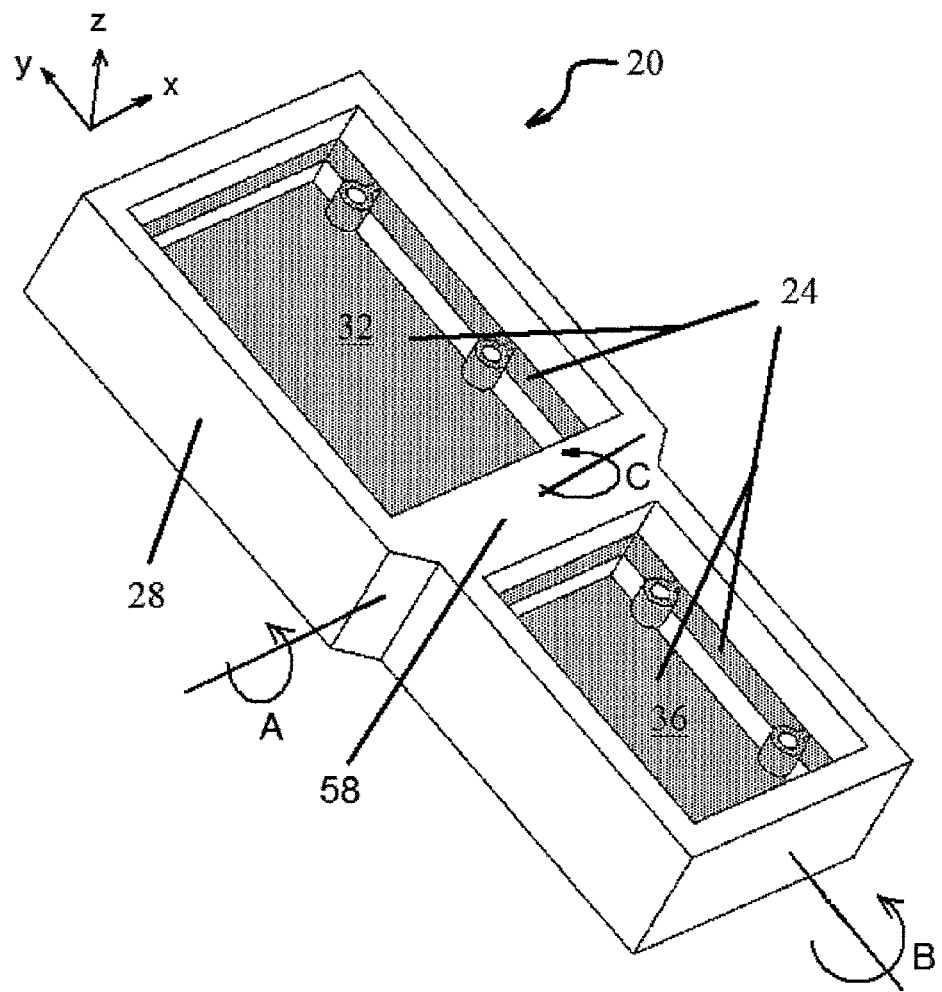
FIG. 1 shows a perspective view of an enclosure in accordance with the present invention.

An enclosure in accordance with the present invention is indicated generally at 20 in FIG. 1. As illustrated, enclosure 20 comprises one or more inserts 24 which are overmolded with a suitable material 28 to form enclosure 20. The terms "inserts 24" and "insert 24" are used herein to generically refer to suitable inserts for use with the present invention. In the following discussion, some inserts with specific features are referred with different reference numbers for clarity of description, but it is intended that all inserts described herein are also encompassed by the terms "inserts 24" or insert "24".

Preferably, material 28 is resilient and can be any suitable material such as a thermoplastic elastomer or a rubber compound, etc. which can be injection molded. Examples of suitable materials include the thermoplastic elastomer "Versollan™ OM 1262NX-9", sold by PolyOne, 33587 Walker Road, Avon lake, Ohio, USA or a liquid silicone rubber such as "KE2090-40 Select-Hesive", sold by Shin Etsu Silicones of America, 1150 Damar Street, Akron, Ohio, USA.

While it is preferred that material 28 be at least somewhat resilient, it is also contemplated that in some circumstances other, non-resilient, materials can be employed if desired and the selection of such materials is within the normal skill of those working in the art.

Figure 2:
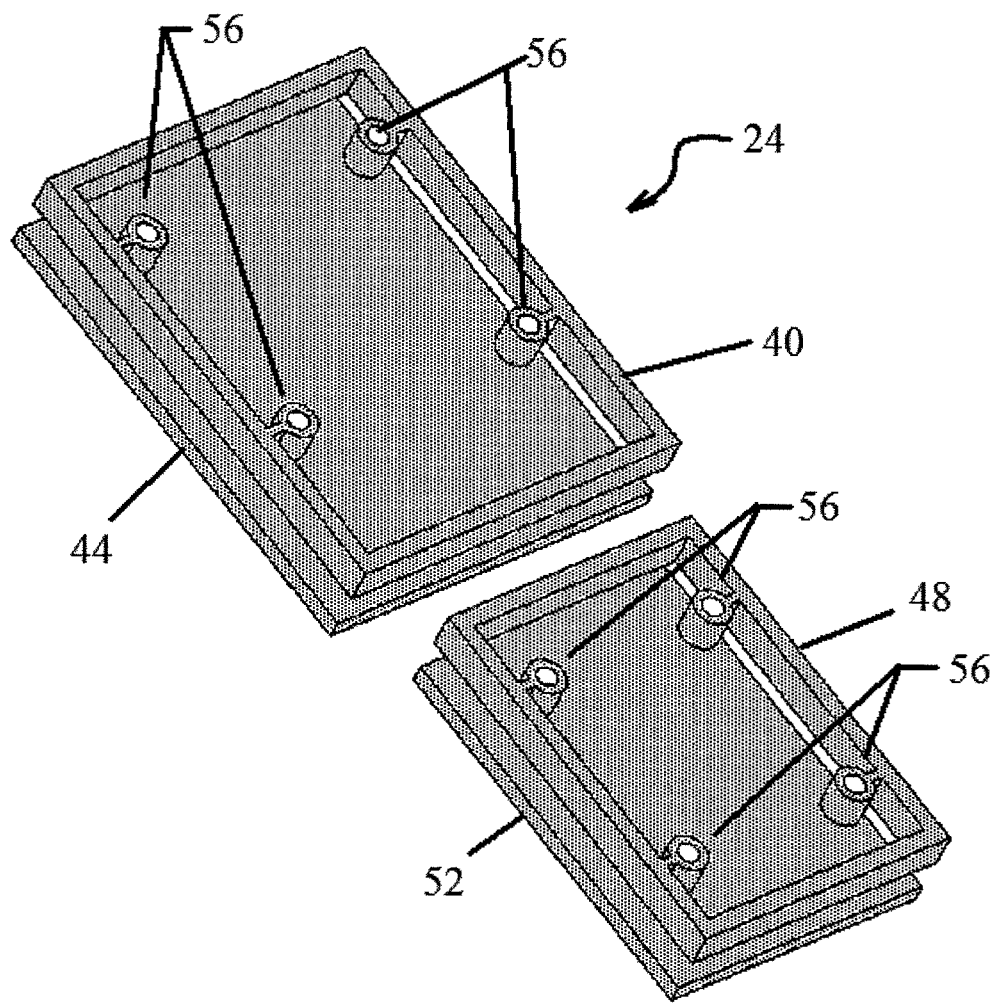
FIG. 2 shows a perspective view of a set of inserts which can be overmolded to form the enclosure of FIG. 1.

A set of inserts 24, which may be used in forming enclosure 20, are shown in more detail in FIG. 2. Inserts 24 can be made of any suitable material, or combination of materials, as will occur to those of skill in the art and inserts 24 serve as stiffeners and/or force directors in enclosure 20. Non-limiting examples of suitable materials for inserts 24 include steel, aluminum, copper, magnesium alloys, zinc alloys, carbon fiber composites and/or carbon nanotube materials. The selection of appropriate materials for inserts 24 will be apparent to those of skill in the art in view of the disclosure below.

In the illustrated example of FIG. 1, it is desired that enclosure 20 include two compartments 32 and 36 within enclosure 20. Compartment 32 can, for example, include a main logic board, a touch screen display and other assemblies, while compartment 36 can include a battery power source, a keyboard and other assemblies. Each of compartments 32 and 36 has an open face into which a display (not shown) and a keyboard (also not shown), respectively, can be placed.

The present invention is not limited to use with enclosures having two compartments, nor is the present invention limited to enclosures with one or more open faces and, instead, the present invention can be used to form enclosures in a wide variety of configurations and arrangements, with single compartments or multiple compartments and with or without one or more open faces or other apertures.

As shown in FIG. 2, the set of inserts 24 used in the manufacture of the example enclosure 20 of FIG. 1 includes a frame member 40 and a back panel 44 which help define compartment 32 and a frame member 48 and back panel 52 which help define compartment 36. As shown, frame 40 and/or frame 48 can include mount points 56 with which assemblies can be mounted within enclosure 20. Mount points 56 can be threaded, to receive screws or the like, or can be any other suitable mounting system for mounting assemblies within enclosure 20, as will occur to those of skill in the art.

While not shown in FIG. 2, back panels 44 and 52 can also include mount points in the form of: threaded bores to receive screws; bores to receive appropriate mounting inserts; raised bosses to support circuit boards; etc. While not shown in FIG. 1, one or more passages or openings can be provided through dividing portion 58 of enclosure 20 to allow for interconnections to be routed, as needed, between assemblies in compartments 32 and 36.

In use, inserts 24 will be placed into a mold and will be overmolded with material 28 to form enclosure 20. The overmolding of different materials, or different colors of materials, is well known and will not be discussed herein in detail. The present invention is not limited to enclosure 20 being formed through a single overmolding of inserts 24, and it is contemplated that additional overmolds of different materials can also be performed, such as forming structures of resilient material at one or more of the corners of enclosure 20 to serve as "bumpers", if such is desired.

In many prior art enclosures, such as the above-mentioned enclosures for the MacBook and Toughbook laptop computers, the enclosures are designed to inhibit deformation of the enclosure and critical components within the laptops must be mounted to the enclosure via resilient mounts to reduce the amount of the impact energy that is transferred to them from the enclosure. Even with such "rugged" designs, these devices are not well suited to tolerating shocks as the shock energy (typically from a drop or impact) is not dissipated through deformation of the enclosure, or otherwise.

The present inventors have determined that one method to cope with the energy imparted to enclosure 20 and its contents by a physical shock is to have enclosure 20 temporarily deform and elastically recover, in a selected manner, thus absorbing and dissipating the shock energy which would otherwise potentially damage enclosure 20 and/or the assemblies within enclosure 20.

In accordance with the present invention, and as discussed in more detail below, enclosure 20 is intended to elastically deform under shocks. The designer of enclosure 20 can select where deformations of enclosure 20 are intended to occur, the type of deformations which can occur (rotational, translational, folding, bending, etc.) and the designer will place and mount the assemblies within enclosure 20 accordingly in order to reliably tolerate designed levels of shock which can be more severe than those of prior art enclosures.

In the example illustrated in FIGS. 1 and 2, it should be readily apparent that frame member 40 will inhibit distortion of compartment 32 and frame member 48 will inhibit distortion of compartment 36 but also that enclosure 20 can distort such that compartment 32 will move with respect to compartment 36. Specifically at the dividing portion 58 of enclosure 20, between compartment 32 and compartment 36, enclosure 20 can rotate (arrow A) about the X axis, or can rotate (arrow B) about the Y axis or rotate (arrow C) about the Z axis.

Further, enclosure 20 can compress/translate at dividing portion 58, moving compartment 36 along the Y axis towards compartment 32, or elongate/translate at dividing portion 58 moving compartment 36 along the Y axis away from compartment 32. As will be apparent, dividing portion 58 can undergo various combinations of the listed movements as well.

With the proper selection of material 28 and the size, shape and placement of dividing portion 58 relative to frames 40 and 48, the designer of enclosure 20 can design enclosure 20 to elastically deform in the selected manner and rebound at dividing portion 58 to absorb and dissipate a given amount of shock energy while ensuring that assemblies in compartments 32 and 36, and any interconnections therein, will not be damaged.

Figure 3:
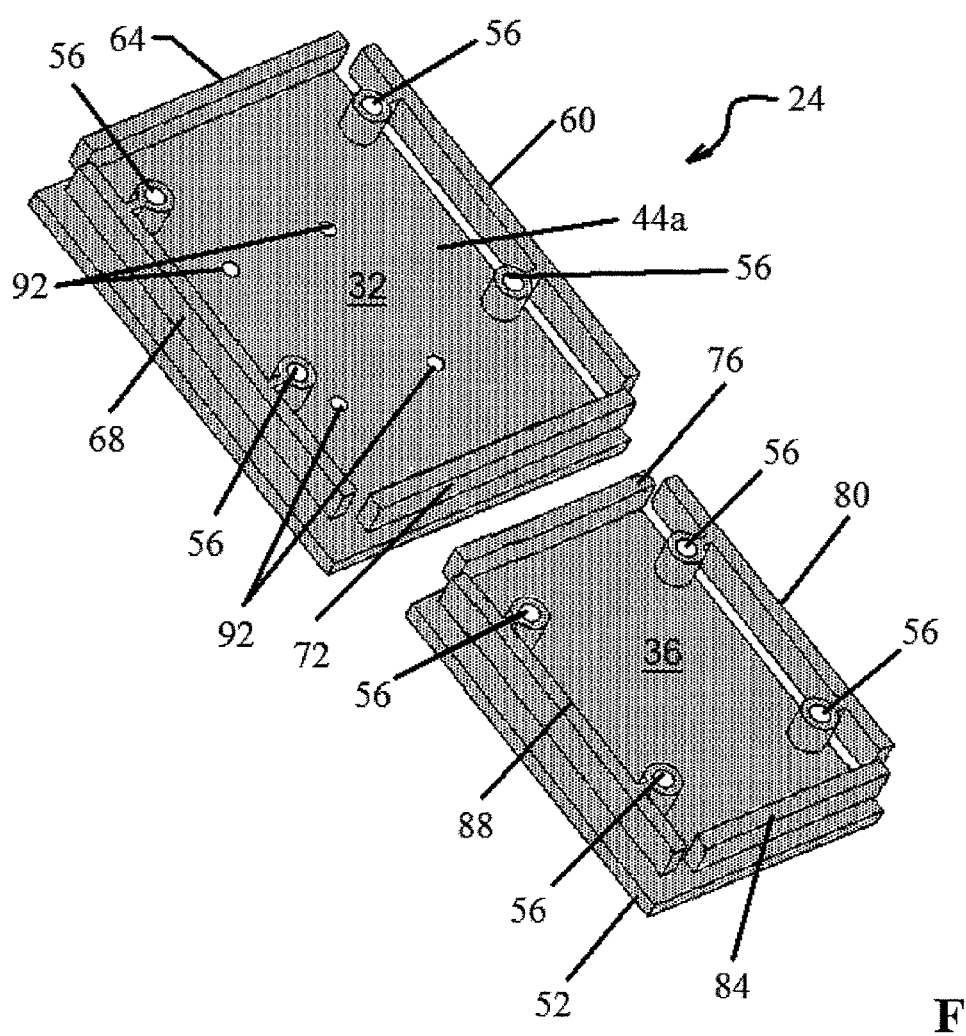
FIG. 3 shows a perspective view of another example of a set of inserts for use with the present invention.

FIG. 3 shows another embodiment of a set of inserts 24 for an enclosure 20. In this embodiment, inserts 24 are similar to those shown in FIG. 2 except that, instead of having single-piece frame 40, compartment 32 is defined by four side rails 60, 64, 68 and 72. Similarly, instead of having single-piece frame 48, compartment 36 is defined by four side rails 76, 80, 84 and 88. FIG. 3 also shows back panel 44a (a variant of back panel 44) which includes four threaded bores 92 which can be used to mount circuit boards etc., as mentioned above.

As will be apparent to those of skill in the art, the way in which an enclosure 20 fabricated with the inserts of FIG. 2 responds to a shock, will differ from the way in which an enclosure 20 fabricated with the inserts of FIG. 3 would respond to the same shock.

Specifically, with the configuration of FIG. 3, in addition to the above described deformation of dividing portion 58, the outer periphery of compartment 32 can elastically deform and rebound, as can the outer periphery of compartment 36. The design of FIG. 3 may therefore be able to better tolerate larger shocks, as more material and area is available to elastically deform and rebound to dissipate the shock energy, and/or be better able to accommodate shocks applied in a wider range of directions than would be the case with the design of FIG. 2.

Because the outer periphery of compartment 32 can deform, it may be desired to mount assemblies in that compartment via threaded bores 92 on back panel 44a, as back panel 44a will not be deformed by the shock, or to a single side rail. In such a case, it will be necessary for the designer to provide necessary clearances between any such assemblies and the peripheral walls of compartment 32 to allow the deformation to occur without the walls contacting the assemblies. If compartment 32 needs to include multiple assemblies with electrical interconnections therebetween, provided that each of these assemblies is mounted to back panel 44a or another common insert 24 such as a side rail, there will be no relative movement therebetween and thus the interconnections will not be subjected to stress from the relative movement of the assemblies.

Alternatively, depending upon the nature and size of the assemblies within a compartment, it may still be acceptable to use mounts 56 or any other means to mount the assemblies (as illustrated for compartment 36), and/or to mount one or more assemblies in compartment 32 using bores 92 and one or more other assemblies in compartment 32 using mounts 56. A similar variety of mounting configurations can be employed within compartment 36 and/or any other compartment provided by an enclosure in accordance with the present invention.

If the designer does not have all of the multiple assemblies mounted to a common insert 24, then the designer will need to determine the expected relative movement between assemblies and design the interconnections to accommodate such movement. These accommodations can comprise a variety of techniques including, without limitation, providing "slack" in the interconnection to accommodate the movement, providing positive locking connectors at each end of the interconnection, anchoring the connector at each end of the interconnection to the respective insert 24, etc. As used here, the term "connector" is intended to comprise any method of establishing and maintaining an electrical connection, including without limitation, removable connectors, soldered connections, etc.

Figure 4:
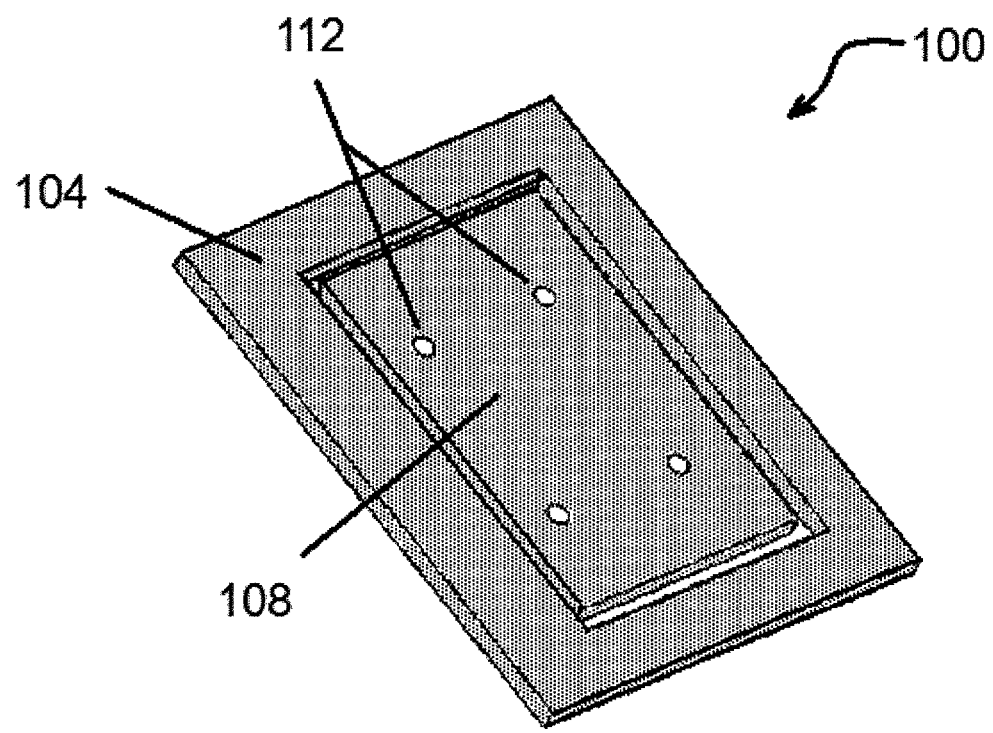
FIG. 4 shows a perspective view of an example of a two-part insert for use with the present invention.

FIG. 4 shows another variant of an insert 100 for use with the present invention. In FIG. 4, insert 100 can be a back panel, or panel for another part of enclosure 20. Insert 100 includes an outer member 104 and an inner member 108 and at least inner member 108 includes a mounting feature, such as threaded bores 112. When overmolded with a material, such as material 28 (not shown) 28, inner member 108 will be separated from outer member 104 by the overmold material 28. In such a case, inner member 108 and any assemblies mounted to it via bores 112, or by other means, will be elastically separated from outer member 104 by the intervening material 28.

Thus, in the case of a shock being applied to outer member 104, some degree of energy absorption will occur in material 28 between inner member 108 and outer member 104, thus reducing the energy applied to assemblies mounted to inner member 108. As will be apparent, insert 100 can be used to replace back panels 44 and/or 52 of the embodiment shown in FIG. 2, or in a variety of other configurations as will occur to those of skill in the art. Further, such a two-part, or multi-part, insert can be used as sides, ends or other parts of an enclosure 20 as desired. Further still, such a two part insert can provide a limited amount of pressure relief to accommodate ambient pressure changes if enclosure 20 is hermetically sealed.

In the present invention, inserts can be formed of different materials if desired. In the example of FIG. 4, outer member 104 may be formed of aluminum or a magnesium alloy while inner member 108 can be formed of carbon fiber or other materials. In this way, outer member 104 can be sufficiently robust to endure a large impact, while inner member 108 will be relatively light weight. Other combinations of suitable materials will be apparent to those of skill in the art.

Figure 5:
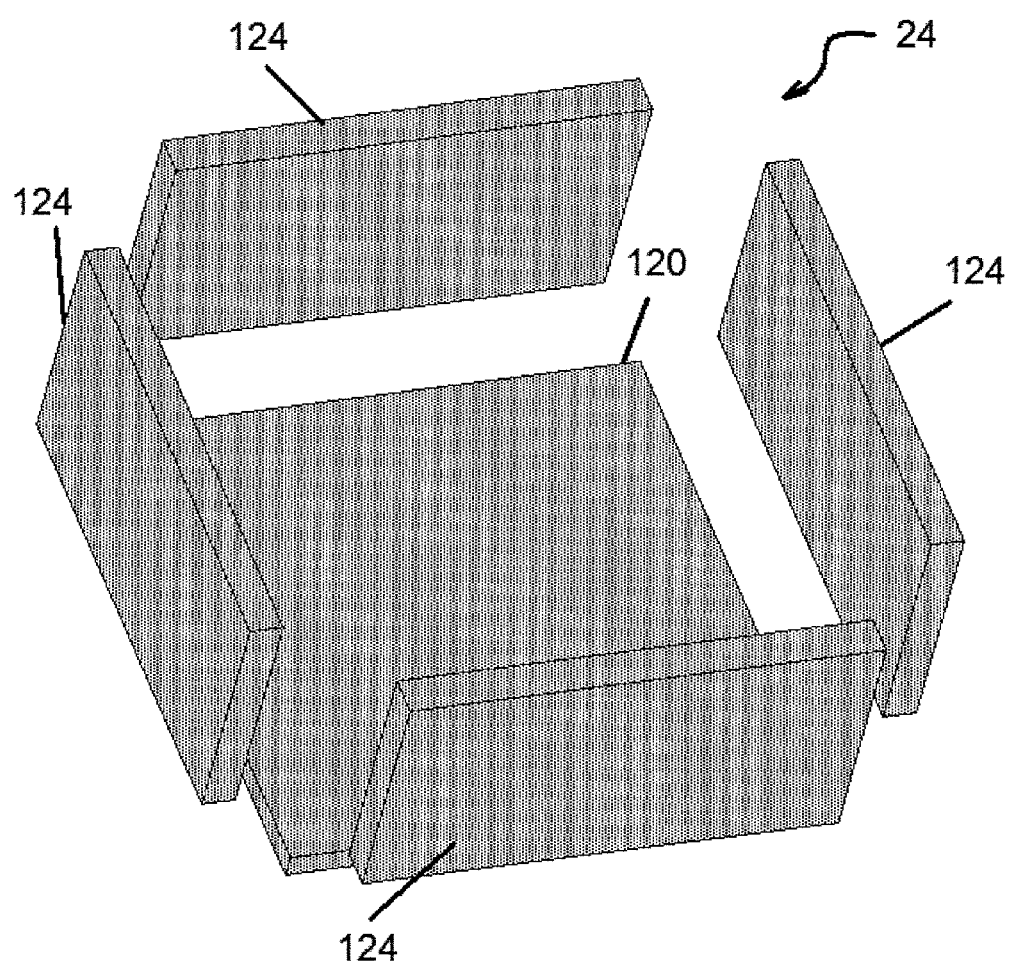
FIG. 5 shows a perspective view of another example of a set of inserts for use with the present invention.

FIG. 5 shows another embodiment of a set of inserts 24 for an enclosure 20. In this embodiment, set of inserts 24 comprises a back panel insert 120, and four wall inserts 124 which can be used to form an enclosure 20 comprising a single compartment, or to form a compartment in an enclosure 20 comprising multiple compartments. As will be apparent, in the illustrated example wall inserts 124 each have the same dimensions, resulting in a compartment with a square periphery, but it should be apparent that two or more specific wall inserts 124 can be employed, each having different dimensions, along with back panels 120 having different shapes so that compartments with rectangular peripheries or including curved walls, etc. can be fabricated as desired. Depending upon the materials from which inserts 24 are fabricated, they can also serve to reduce radio frequency noise emitted or received by assemblies within enclosure 20. If desired, one or more inserts 24 can be electrically grounded, via an appropriate electrical connection, to configure their desired radio frequency characteristics.

It is also contemplated that, where inserts 24 are formed of electrically conductive materials, inserts 24 can act as power or signal conductors between various assemblies mounted within enclosure 20. For example, a side wall insert 24 may serve as a +V power rail and another insert 24 may serve as a −V power rail, where "V" represents an electrical power source, such as a battery, available within enclosure 20. In this example, assemblies could thus obtain power by having appropriate connections to the respective inserts 24. As will be apparent, such electrical connections could be implemented via the mounts used to mount the assemblies within enclosure 20.

Figure 6:
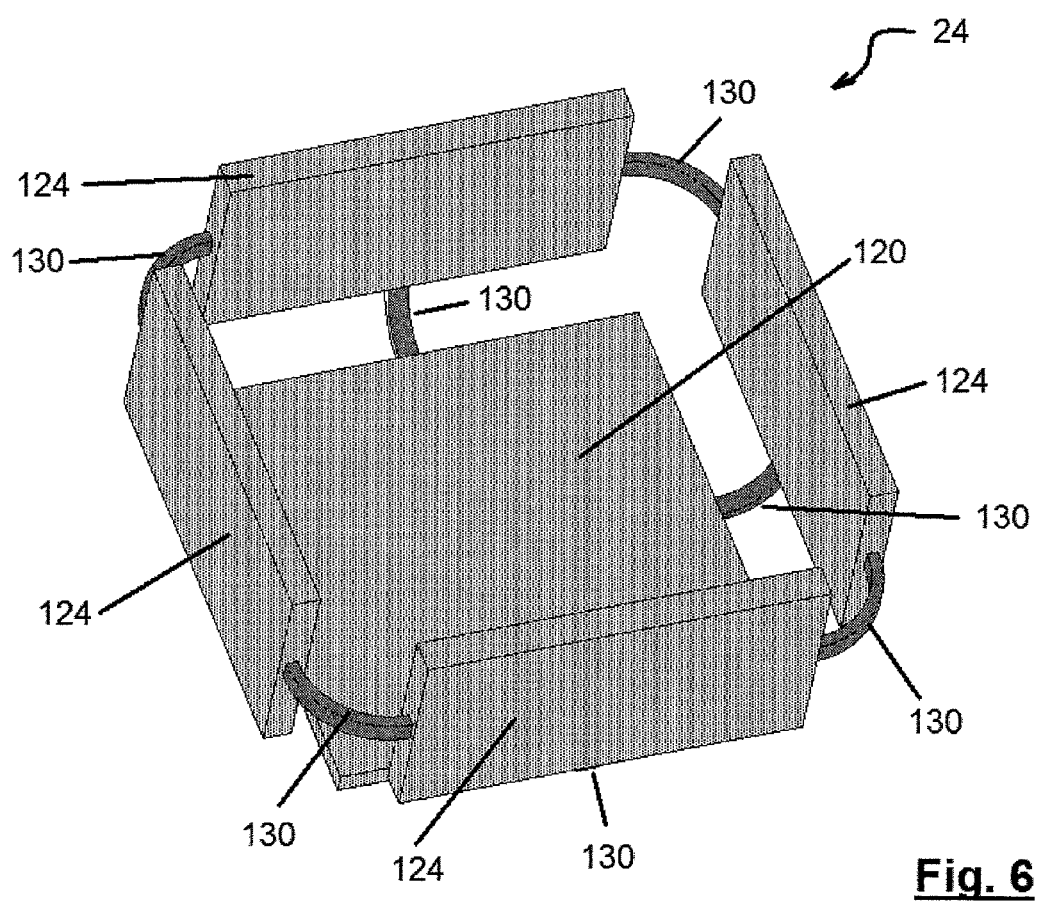
FIG. 6 shows a perspective view of another example of a set of inserts interconnected with link elements, for use with the present invention.

FIG. 6 shows yet another embodiment of a set of inserts 24 for forming an enclosure 20, or a compartment in a multi compartment enclosure 20. In this embodiment, the set of inserts 24 is similar to the inserts of FIG. 5 but the inserts are interconnected by link elements 130 which can serve several purposes.

In one embodiment, set of inserts 24 can be formed as an integral unit including, for example, back panel 120, walls 124 and link elements 130 to allow for simplified placement into a mold for subsequent overmolding. For example, set of inserts 24 can be formed by die casting, thixomolding, injection molding, etc. and then placed as a unit into a mold for overmolding with material 28. Thus, the molding operation only requires the handling of a single integral assembly of inserts 24 rather than having to load the mold with multiple individual inserts 24.

In one alternative, after the overmolding operation is complete and enclosure 20 is formed, link elements 130 can broken by intentionally deforming enclosure 20, prior to installation of assemblies, to over-stress and thus break link elements 130. As will be apparent to those of skill in the art, link elements 130 can be designed to easily break under a relatively small applied stress, for example by have a small cross sectional area or including features such as part lines or defined weakness areas in link elements 130.

In another alternative, link elements 130 can be designed to be left intact and subsequently used to help dissipate shock energy. For example, if a finished device including enclosure 20 is dropped in use, as enclosure 20 deforms one or more of link elements 130 can be broken, absorbing some of the shock energy. While the benefit of such a sacrificial link element 130 can only be used once, ideally the device including enclosure 20 will still be operable after the shock and will be able to continue to be used (albeit with a decreased level of shock resistance due to one or more broken link elements 130).

Further, the level of shock required to break a link element 130 can be selected from the size and design of link elements 130. Thus, link elements 130 can be used to determine if enclosure 20 has been abused and/or subjected to excessive shocks for warranty eligibility determinations, etc.

As will be apparent to those of skill in the art, while link elements 130 have only been illustrated in the embodiment of FIG. 6, link elements 130 can also be used with any configuration of inserts 24 as contemplated herein.

As mentioned above, the present invention allows a designer to select where, how and to what extent enclosure 20 can deform and safely dissipate the energy of a shock. To further assist in the selection and definition of the allowed deformation, inserts 24 can include additional features which define or restrict their movement relative to one another.

Figure 7:
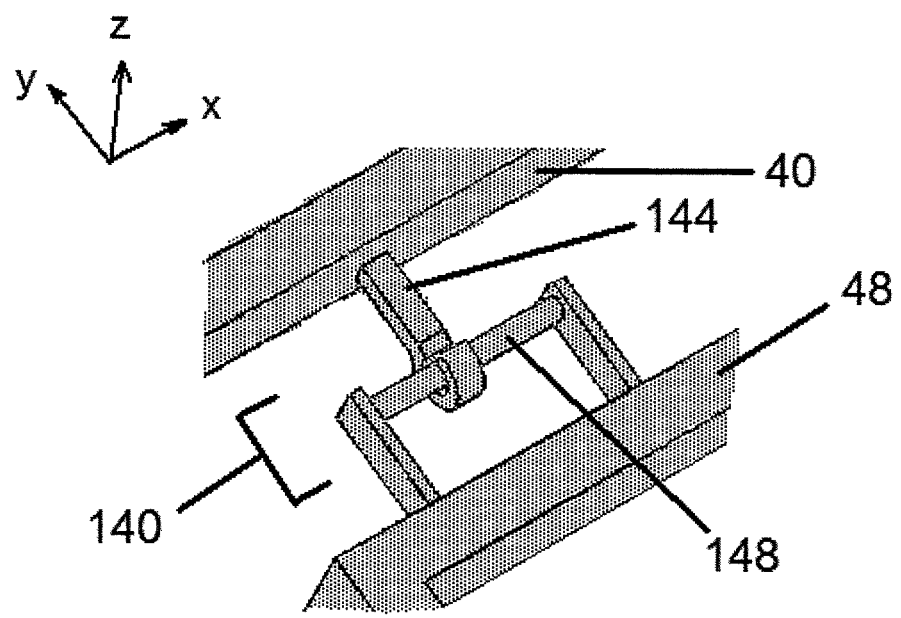
FIG. 7 shows a perspective view of a link element which can be used to connect inserts in accordance with the present invention.

FIG. 7 shows a hinge link element 140 which can interconnect different inserts 24 to limit how they move with respect to one another. Hinge link element 140 comprises a barrel 144, connected to frame 40 in the illustrated example, and a pivot 148, connected to frame 48 in the illustrated embodiment. As will be apparent, when overmolded with material 28 hinge link element 140 permits relative rotation between frames 40 and 48 about the X axis and permits limited translation along the X axis, but inhibits rotation about the Y axis and Z axis and inhibits translation along the Y axis and Z axis.

Hinge link element 140 is not limited to use with frame members, such as frames 40 and 48 and can be used between any two inserts 24 as desired by the designer. Further, depending upon the size and relative positioning of the inserts 24 to be linked, more than one hinge link element 140 can be used between the inserts. As will also be apparent, a link element which provides hinged rotation about an axis but which does not enable any translational movement can also be easily designed and used.

As should also now be apparent, the present invention is not limited to the use of link elements 130 or hinge link elements 140 and a variety of different types of link elements which provide different movement constraints can be employed as desired.

Figure 8:
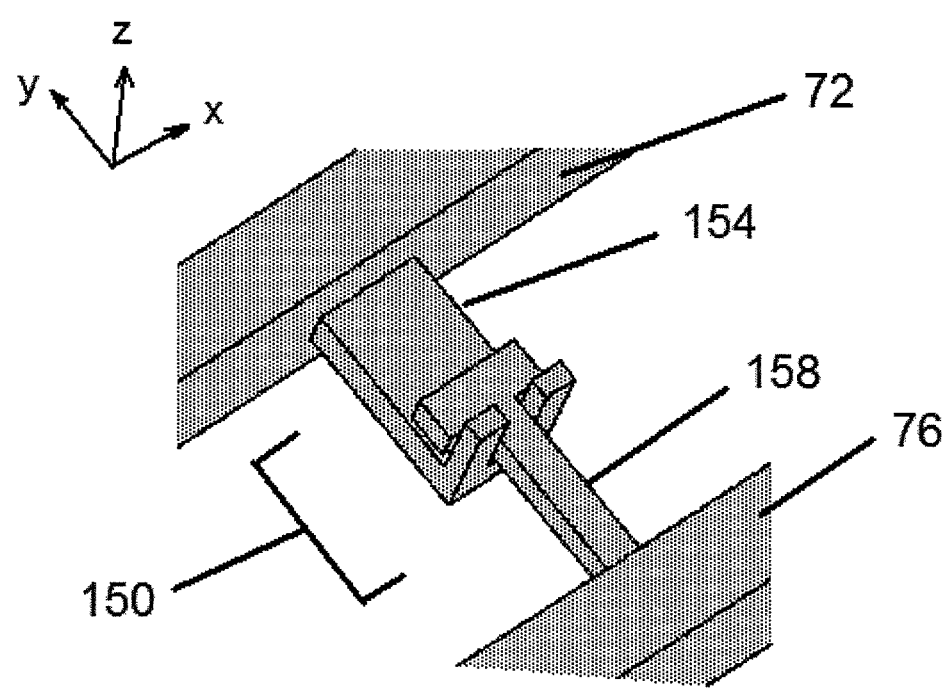
FIG. 8 shows a perspective view of another link element which can be used to connect inserts in accordance with the present invention.

FIG. 8 shows toggle link element 150 which comprises a receiver 154, connected to rail 72 in the illustrated example, and a T bar 158, connected to rail 76 in the illustrated example. Toggle link element 150 permits rotation about the X axis, translation in one direction of the Z axis (i.e.—compression) and translation in the Y axis.

Figure 9:
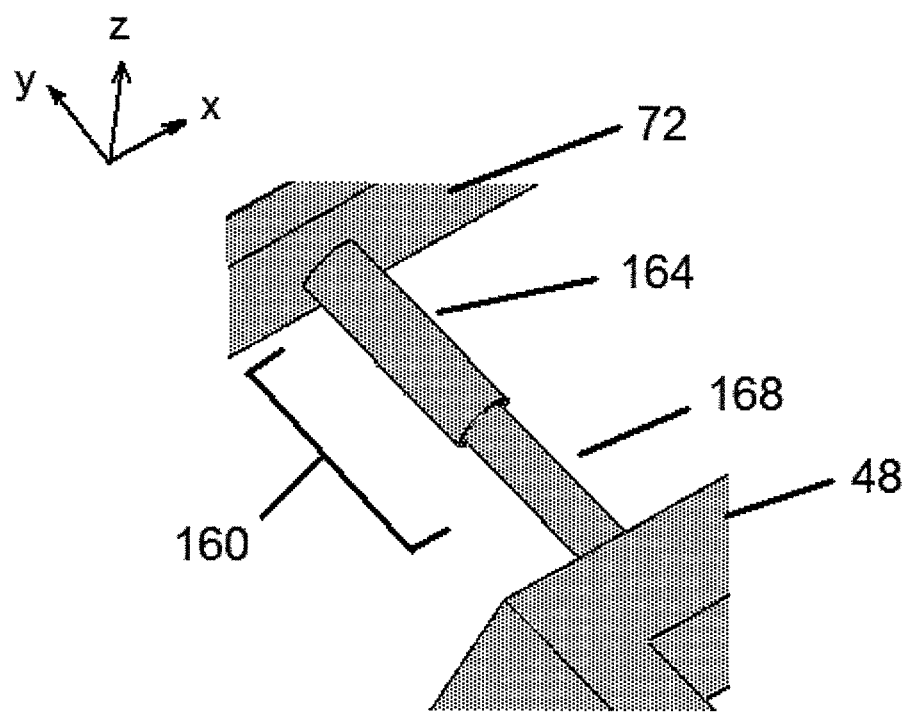
FIG. 9 shows a perspective view of yet another link element which can be used to connect inserts in accordance with the present invention.

FIG. 9 shows telescopic link element 160 which comprises a receiver element 164, connected to rail 72 in the illustrated example, and a male element 168, connected to frame 48 in the illustrated example. Male element 168 is slidably received in receiver element 164 and permits translation of frame 48 with respect to rail 72, along the Y axis and rotation about the Y axis, while preventing rotation or translation along the X or Z axes. Telescopic link element 160 can also include a biasing means, such as a spring, which acts between receiver element 164 and male element 168 to bias those elements together, or away from one another, as desired. Further, with such a biased telescopic link 160, it is contemplated that a preload (either to compress or expand) can be applied to the telescopic link 160 prior to overmolding with material 28 such that the completed enclosure 20 will be subject to the preload which can subsequently enhance the ability of enclosure 20 to direct and dissipate shock loads.

Figure 10:
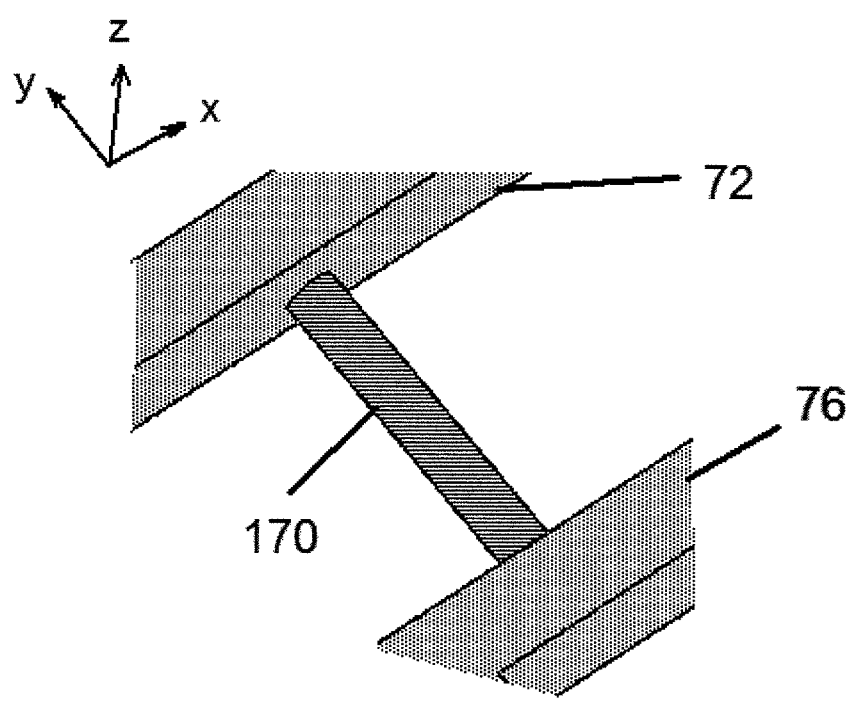
FIG. 10 shows a perspective view of yet another link element which can be used to connect inserts in accordance with the present invention.

FIG. 10 shows another example of a link element which can be used with the present invention. Specifically, flexible link element 170 comprises a length of stainless steel cable, chain, carbon fiber cord or other suitable flexible material which can inhibit translation due to lengthening along an axis (the Y axis in the figure), while permitting all other translations and rotations.

A wide variety of other designs of link elements can be employed with the present invention. Examples of other link elements can include ball and socket joints, universal joints, different hinge designs, etc. Also, limit stops can be included, or separately provided, between link elements to explicitly limit the permitted range of movement (translation and/or rotation) as desired. Further, two or more link elements can be used between inserts 24 to define and constrain their relative movement as desired.

Figure 11:
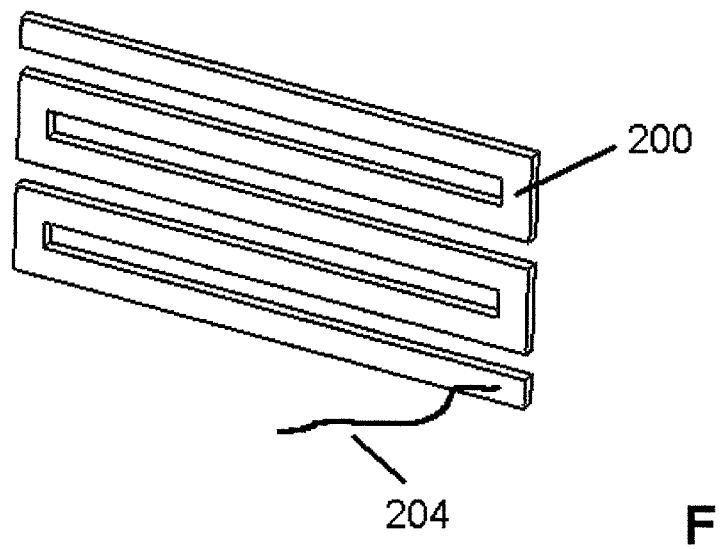
FIG. 11 shows a perspective view of an insert which is also a radio antenna.

It is further contemplated that inserts 24 can provide additional functions, in addition to the formation of enclosure 20. FIG. 11 shows an insert 200, which can be employed as a side wall insert, a back panel insert or front panel insert, etc. and which is also a radio antenna. Insert 200 can include a radio signal feed line 204 which will extend into the interior of enclosure 20 when insert 200 is overmolded and which will allow a radio assembly within enclosure 20 to be properly connected to insert 200.

Figure 12:
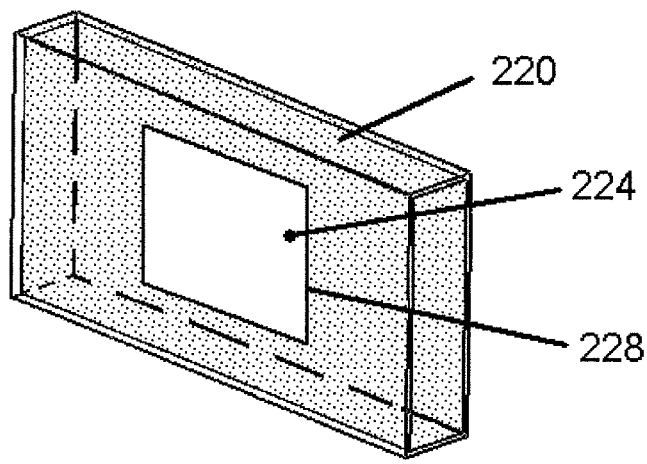
FIG. 12 shows a perspective view of an insert which defines a storage volume.

FIG. 12 shows another insert 220 which includes an open volume 224 therein. Insert 220, which is not limited to the illustrated rectilinear shape, is overmolded with material 28 as before, but insert 220 includes an opening 228 which, after overmolding of insert 220, provides access to volume 224. Opening 228 can include a moveable cover (not shown) if desired, or can be an open aperture. It is contemplated that volume 224 of insert 220 can be used to hold assemblies, such as batteries, etc. or can be used as a Faraday cage for RF-emitting or RF-sensitive assemblies. In such a case, it may be desired to electrically ground insert 220 as appropriate.

Figure 13:
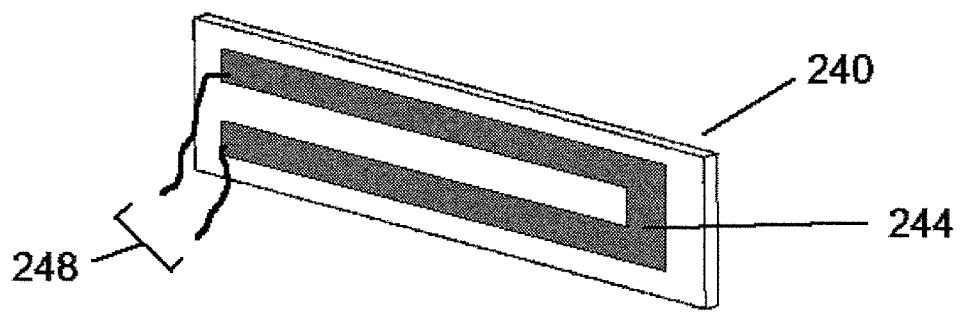
FIG. 13 shows a perspective view of an insert which includes an electric heater element.

FIG. 13 shows another insert 240 which can be used as a side wall, back plate, front plate, etc. for enclosure 20. As illustrated, insert 240 includes a electric heater element 244 formed on at least one face and to which a pair of electrical conductors 248 can be connected. By applying a voltage across conductors 248 heater element 244 will generate heat. Insert 240 can be placed into a mold and overmolded with material 28, as described above, with conductors 248 extending into the interior of enclosure 20 to permit a voltage to be applied to heater element 244 as desired. It is contemplated that insert 240 can be used for enclosures 20 of devices intended to be used in freezers or other cold environments.

Figure 14:
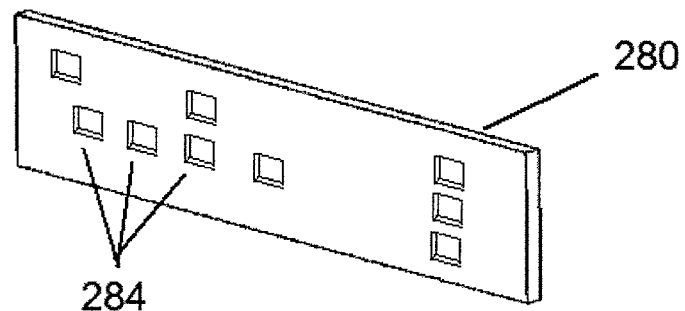
FIG. 14 shows a perspective view of an insert which includes indicia to identify an enclosure including the insert.

FIG. 14 shows another insert 280, which can provide additional advantages by incorporating identifying indicia, such as through holes 284. After insert 280 is overmolded to form an enclosure 20, the indicia can be suitably imaged, such as via an X-ray device, to discern the indicia which can be used to uniquely identify the enclosure 20 (and hence the device comprising it). In such a case, the arrangement of the indicia can be unique for each insert 280 and thus for each enclosure formed therefrom.

Figure 15:
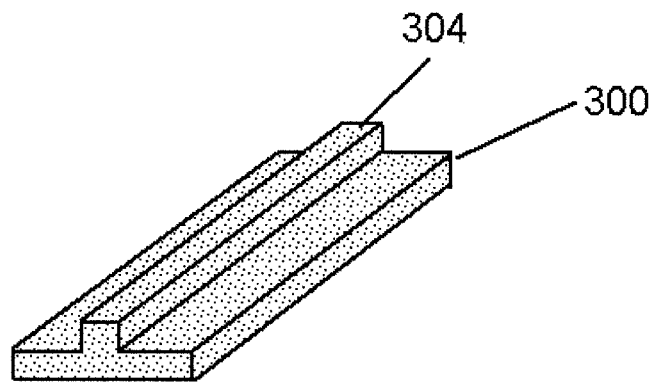
FIG. 15 shows a perspective view of an insert with a feature which is exposed on the outside of an enclosure after over molding of the insert.
Figure 16:
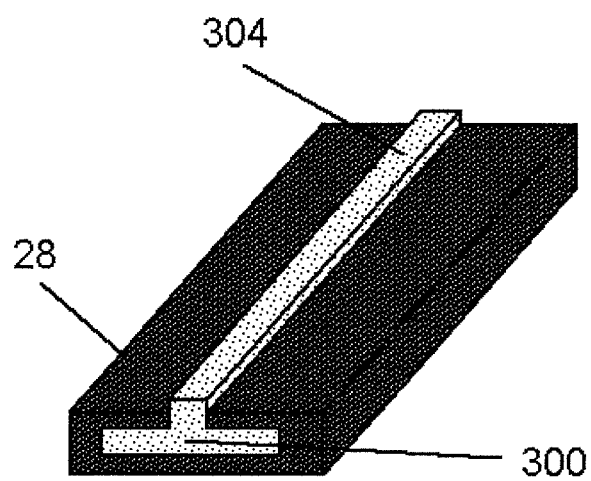
FIG. 16 shows the insert of FIG. 15 after overmolding with the feature being exposed.

FIGS. 15 and 16 show another insert 300 which includes a feature 304, in this case a rub rail, which is intended to be exposed outside enclosure 20 after insert 300 has been overmolded with material 28. In other embodiments, feature 304 can comprise different features, such as cosmetic features like trim rails or logos, or functional features, such as rub or wear rails, which are intended to remain exposed on the exterior of enclosure 20 after overmolding with material 28.

As will now be apparent, the present invention provides an enclosure for a device comprising one or more electronic assemblies where that enclosure is designed such that, under a shock the enclosure will deform in one or more selected manners to dissipate the shock energy. The deformation, which is elastic deformation, occurs at selected parts of the enclosure and/or in selected translations and/or rotations where those selections are made by the designer of the enclosure. The resulting enclosure can have a lower weight than an equivalent conventional enclosure and can have a lower cost of construction than with prior art designs as a strong enclosure can be obtained using low cost molding material in combination with a suitable set of inserts to achieve a desired level of physical shock resistance.

By being able to define where and how the deformations will occur, the designer can locate, mount and interconnect the electronic assemblies within the enclosure to inhibit the occurrence of damage to the assemblies and the device.

The above-described embodiments of the invention are intended to be examples of the present invention and alterations and modifications may be effected thereto, by those of skill in the art, without departing from the scope of the invention which is defined solely by the claims appended hereto.

We claim:

1. An enclosure for an electronic device comprising one or more electronic components, the enclosure comprising:
    a set of inserts overmolded with a moldable material to define at least one compartment to receive the one or more electronic components, the compartment being elastically deformable under physical shock,
    wherein the set of inserts include broken link members, the link members formed as part of the inserts,
    the link members being broken prior to receiving one or more electronic components in the enclosure.

2. The enclosure of claim 1 wherein at least one insert includes an electric heater element thereon.

3. The enclosure of claim 1 wherein at least one insert is also a radio antenna element.

4. The enclosure of claim 1 wherein at least one insert includes identifying indicia.

5. The enclosure of claim 1 wherein at least one insert includes a volume into which an assembly of electronic components can be placed, the volume being accessible from within the enclosure.

6. The enclosure of claim 1 wherein the moldable material is a thermoplastic elastomer.

7. The enclosure of claim 1 wherein the moldable material is a silicone rubber.

8. The enclosure of claim 1 wherein the moldable material is a rubber compound.

9. An enclosure for an electronic device comprising one or more electronic components, the enclosure comprising:
    a set of inserts overmolded with a moldable material to define at least one compartment to receive the one or more electronic components, the compartment being elastically deformable under physical shock,
    wherein the set of inserts are interconnected by link members formed as part of the inserts, and
    wherein, when the enclosure is subjected to a physical shock, one or more link members break during the elastic deformation of the enclosure, thereby providing shock absorption.

10. The enclosure of claim 9 wherein the level of physical shock the enclosure is subjected to is determined by a breakage of one or more of the link members, the force required to break each link member being predetermined.

11. An enclosure for an electronic device comprising one or more electronic components, the enclosure comprising:
    a set of inserts overmolded with a moldable material to define at least one compartment to receive the one or more electronic components, the compartment being elastically deformable under physical shock,
    wherein the set of inserts are interconnected by link members formed as part of the inserts, the link members being operable to constrain movement between the inserts they interconnect, and
    wherein the link members include at least one of a link member operable to constrain movement between two inserts to a rotational movement, a link member operable to constrain movement between two inserts to a translational movement or a link member operable to constrain movement between two inserts to a pivoting movement.

12. The enclosure of claim 11 wherein the set of inserts comprise a back panel and a frame member.

13. The enclosure of claim 12 wherein the back panel can have at least one assembly of electric components mounted to it.

14. The enclosure of claim 12 wherein the frame member can have at least one assembly of electric components mounted to it.

15. The enclosure of claim 11 wherein the set of inserts comprise a back panel and a set of side inserts, the side inserts defining a periphery of the at least one compartment.

16. The enclosure of claim 15 wherein at least one of the set of side inserts can have at least one assembly of electric components mounted to it.

17. The enclosure of claim 11 wherein the set of inserts comprises a back panel having at least an outer member and an inner member, the inner member being separated from the outer member by a portion of the overmolded material and the inner member including means to mount the at least one assembly of electronic components.

18. The enclosure of claim 11 wherein at least one insert forms a radio frequency shield.

19. The enclosure of claim 11 wherein at least one insert includes a portion which extends outside of the enclosure through the overmolded material.

20. The enclosure of claim 11 wherein at least one insert also serves as part of an electrical circuit.

\* \* \* \* \*